(12) United States Patent
Gehris

(10) Patent No.: US 12,065,368 B2
(45) Date of Patent: Aug. 20, 2024

(54) METHOD AND DIFFUSIOPHORETIC WATER FILTER WITH CHEMICAL CONTAMINANT REMOVAL CAPABILITY

(71) Applicant: Split Rock Filter Systems LLC, New Paltz, NY (US)

(72) Inventor: William C. Gehris, New Paltz, NY (US)

(73) Assignee: Split Rock Filter Systems LLC, New Paltz, NY (US)

( * ) Notice: Subject to any disclaimer, the term of this patent is extended or adjusted under 35 U.S.C. 154(b) by 849 days.

(21) Appl. No.: 16/262,633

(22) Filed: Jan. 30, 2019

(65) Prior Publication Data

US 2020/0216345 A1 Jul. 9, 2020

Related U.S. Application Data

(60) Provisional application No. 62/788,106, filed on Jan. 3, 2019.

(51) Int. Cl.
| | |
|---|---|
| C02F 9/00 | (2023.01) |
| C02F 1/00 | (2023.01) |
| C02F 1/28 | (2023.01) |
| C02F 1/52 | (2023.01) |
| C02F 1/68 | (2023.01) |
| C02F 101/30 | (2006.01) |

(52) U.S. Cl.
CPC ............. *C02F 9/00* (2013.01); *C02F 1/001* (2013.01); *C02F 1/283* (2013.01); *C02F 1/5245* (2013.01); *C02F 1/68* (2013.01); *C02F 2101/301* (2013.01); *C02F 2303/04* (2013.01); *C02F 2305/08* (2013.01)

(58) Field of Classification Search
CPC .. C02F 1/001; C02F 1/283; C02F 1/68; C02F 2101/301; C02F 2305/08; C02F 1/281
See application file for complete search history.

(56) References Cited

U.S. PATENT DOCUMENTS

| | | | | |
|---|---|---|---|---|
| 3,356,526 | A | * 12/1967 | Waldman | D06M 23/00 564/294 |
| 4,533,447 | A | 8/1985 | Meldon | |
| 5,496,472 | A | 3/1996 | Slack et al. | |
| 6,908,547 | B2 | 6/2005 | Cote et al. | |
| 9,932,251 | B2 | 4/2018 | Crooks et al. | |
| 10,155,182 | B1 | 12/2018 | Gehris | |
| 10,463,994 | B2 | 11/2019 | Gehris | |

(Continued)

FOREIGN PATENT DOCUMENTS

| | | |
|---|---|---|
| CA | 2909003 A1 | 4/2017 |
| CN | 103807457 | 5/2014 |

(Continued)

OTHER PUBLICATIONS

Shin et al. "Accumulation of Colloidal Particles in Flow Junction Induced by Fluid Flow and Diffusiophoreses," Physical Review X 7, 041038 (2017), Nov. 16, 2017.

(Continued)

*Primary Examiner* — Ryan B Huang

(57) ABSTRACT

A diffusiophoretic water filtration system is provided, including a diffusiophoretic water filter; and a particle disperser upstream of the diffusiophoretic water filter. Methods are also provided.

20 Claims, 2 Drawing Sheets

(56) References Cited

U.S. PATENT DOCUMENTS

| | | | |
|---|---|---|---|
| 10,632,401 B2 | 4/2020 | Gehris | |
| 2003/0121841 A1 | 7/2003 | Harttig et al. | |
| 2007/0102359 A1* | 5/2007 | Lombardi | B01D 61/16 210/764 |
| 2011/0062079 A1* | 3/2011 | Daines-Martinez | B01D 61/58 210/601 |
| 2011/0198225 A1 | 8/2011 | Kim et al. | |
| 2014/0056992 A1* | 2/2014 | Rai | C09C 1/3692 424/617 |
| 2015/0353376 A1 | 12/2015 | Hanover | |
| 2016/0375407 A1 | 12/2016 | Velegol | |
| 2018/0193809 A1* | 7/2018 | Higashitani | B01F 25/438 |
| 2018/0201525 A1 | 7/2018 | Crooks et al. | |
| 2018/0257054 A1 | 9/2018 | Shardt et al. | |
| 2019/0151776 A1 | 5/2019 | Gehris | |
| 2019/0151795 A1 | 5/2019 | Gehris | |
| 2019/0151803 A1 | 5/2019 | Gehris | |
| 2019/0248681 A1* | 8/2019 | Jasim | C02F 1/444 |
| 2020/0155984 A1 | 5/2020 | Gehris | |
| 2020/0255299 A1* | 8/2020 | Stone | C02F 1/48 |

FOREIGN PATENT DOCUMENTS

| | | | |
|---|---|---|---|
| WO | WO 2015/077674 A1 | 5/2015 | |
| WO | WO2018048735 A1 | 3/2018 | |
| WO | WO2019099586 A1 | 5/2019 | |
| WO | WO2020123802 A1 | 6/2020 | |

OTHER PUBLICATIONS

"Membraneless water filtration using CO2" by Shin et al. (Nature Communications 8:15181), May 2, 2017.

"Diffusiophoresis at the macroscale" by Mauger et al. (arXiv: 1512.05005v4), Jul. 6, 2016.

"Origins of concentration gradients for diffusiophoresis" by Velegol et al, (10.1039/c6sm00052e), pp. 4686 to 4703, May 13, 2016.

U.S. Appl. No. 16/215,562, filed Dec. 10, 2018.

"Significance of Zeta Potential in the Adsorption of Fulvic Acid on Aluminum Oxide and Activated Carbon," Anielak et al., Polish Journal of Environmental Studies 20(6):1381-1386—Jan. 2011.

"Influence of bacteria adsorption on zeta potential of Al2O3 and Al2O3/Ag nanoparticles in electrolyte and drinking water environment studied by means of zeta potential" Jastrzębska et al. , Surface & Coatings Technology 271 (2015) 225-233.

"Adsorption of perfluorooctanoic acid and perfluorooctanesulfonic acid to iron oxide surfaces as studied by flow- through ATR-FTIR spectroscopy" in Environ. Chem. 2012, 9, 148-157, by Xiaodong Gao and Jon Chorover.

Bessho et al.:"Adsorption Behavior of Beryllium(II) on Copper-oxide Nanoparticles Dispersed in Water: A Model for 7 Be Colloid Formation in the Cooling Water for Electromag nets at Hig h-energ y Accelerator Facilities," Analyticalsciences Nov. 2014, vol. 30, 1069-1074.

Reverse Osmosis Pretreatment, downloaded on Jan. 14, 2018 from https://www.lenntech.com/ro/ro-pretreatment.htm, Jan. 4, 2008.

Ultrafiltration downloaded on Jan. 14, 2018 from https://www.lenntech.com/library/ultrafiltration/ultrafiltration.htm, Mar. 11, 2008.

Isaias:"Experience in reverse osmosis pretreatment," Desalination 139 (2001), 57-64.

Brunelle et ai:"Colloidal Fouling of Reverse Osmosis Membranes," Desalination 32 (1980) 127-135, Jan. 1980.

Borthakur et al.:"Adhesion of gram-negative bacteria onto α-Al2O3 nanoparticles: A study of surface behaviour and interaction mechanism," Journal of Environmental Chemical Engineering 6 (2018) 3933-3941, Aug. 2018.

Hyomin Lee et al.:"Diffusiophoretic exclusion of colloidal particles for continuous water purification," Lab Chip, 2018, 18, 1713-1724, Jun. 21, 2018.

\* cited by examiner

METHOD AND DIFFUSIOPHORETIC WATER FILTER WITH CHEMICAL CONTAMINANT REMOVAL CAPABILITY

This claims priority to U.S. Provisional Application No. 62/788,106, filed Jan. 3, 2019.

BACKGROUND

Patent Application No. WO 2018/048735A1 and U.S. Pat. No. 10,155,182 B1 disclose gas-driven diffusiophoretic water filters that can remove colloidal particles from water via the process of diffusiophoresis. This process acts on colloidal particles having a surface charge, or zeta potential. U.S. application Ser. No. 16/215,562 filed Dec. 10, 2018 discloses an ion-exchange driven diffusiophoretic water filter. These are all incorporated by reference herein.

Several articles discuss the adsorption of chemicals or other charged particles such as bacteria on nanoparticles, and also address the effect of that adsorption on zeta potential. These articles include "Significance of Zeta Potential in the Adsorption of Fulvic Acid on Aluminum Oxide and Activated Carbon," Anielak et al., Polish Journal of Environmental Studies 20(6):1381-1386•January 2011; and "Influence of bacteria adsorption on zeta potential of $Al_2O_3$ and $Al_2O_3/Ag$ nanoparticles in electrolyte and drinking water environment studied by means of zeta potential" Jastrzębska et al., Surface & Coatings Technology 271 (2015) 225-233.

SUMMARY OF THE INVENTION

Many contaminants, for example many of the organic chemicals and other contaminants listed on the National Primary Drinking Water Regulations of the Environmental Protection Agency, cannot be removed or filtered by the diffusiophoretic water filters of the patent documents listed above.

The present invention provides a diffusiophoretic water filtration system comprising: a diffusiophoretic water filter, and a particle disperser upstream of the diffusiophoretic water filter.

The particle disperser can disperse for example nanoparticles that attract the organic chemicals or other contaminants, for example via adsorption. Preferred nanoparticles include metal oxides in nanoparticle form, such as $Al_2O_3$, $Fe_2O_3$, FeOOH, and $SiO_2$, but can include carbon nanotubes, cerium oxide, ceramic oxides, chemically-activated carbon fibers, or other nanoparticles. The nanoparticles preferably have a positive zeta-potential in the water medium to be filtered, and have an average particle diameter of less than 10 nanometers.

The contaminants may include any PFOAS, PFOS, dioxin, benzene and any chemical or metal ionic species that can be adsorbed or attracted to the particle.

The adsorbed contaminant-particle combination can have a zeta potential that allows diffusiophoretic filtering. For example, acids such as PFOA are negatively charged and when adsorbed by a positively charged nanoparticle, the combination can have a zeta potential which is still negative. The zeta potential of the adsorbed contaminant-particle combination preferably is at least −10 mV, more preferably at least −20 mV, so that the combination can be removed efficiently by the diffusiophoretic water filter. Surprisingly, the contaminants actually may improve the diffusiophoretic action of the diffusiophoretic water filter on the nanoparticles. For example, the electrokinetic potential of aluminum oxide after adsorption of fulvic acid actually stabilizes and this stabilization is beneficial to the filtration by diffusiophoretic water filter. See "Significance of Zeta Potential in the Adsorption of Fulvic Acid on Aluminum Oxide and Activated Carbon," Anielak et al., Polish Journal of Environmental Studies 20(6):1381-1386•January 2011.

The concentration and size of the particle can be selected so that the zeta potentials of the particle-adsorbed contaminant combination exceeds the preferred value of −10 mV, and the more preferred value of at least −20 mV.

In drinking water many colloidal particles are present that are negatively charged and thus may interfere with proper contaminant removal by the above method. Some of these colloidal particles are contaminants themselves such as bacteria and viruses and thus may adsorb to the added particle. The present invention, while permitting such adsorption, prefers that such negatively-charged colloidal particles first be prefiltered, most preferably by an upstream further diffusiophoretic water filter. The upstream water filter thus can remove for example negatively-charged bacteria and viruses that otherwise would adsorb to the added particles. While these colloidal particles also could be adsorbed along with the contaminants, the chemical adsorption may be more effective without the presence of the negatively-charged colloids. Also the negatively-charged colloidal particles such as bacteria and viruses may be better filtered in a non-adsorbed state, and thus may be more efficiently removed upstream of any introduced particles.

The present invention thus also provides a method for removing contaminants from water comprising: adding a particle to the water to attract at least one contaminant and form a adsorbed contaminant-particle combination; and imparting diffusiophoretic action on the adsorbed contaminant-particle combination to permit the adsorbed contaminant-particle combination to be filtered.

The present invention also provides a method for using a particle to adsorb a contaminant in drinking water for use with a diffusiophoretic water filter comprising: adding particles of a certain composition to contaminated water having at least one contaminant sought to be eliminated by diffusiophoretic water filtration, and determining a zeta potential of an adsorbed contaminant-particle combination.

The determining of the zeta potential may be by running the contaminated water through a test diffusiophoretic water filter. The test diffusiophoretic water filter preferably has channel sizes and operating characteristics such as flow velocity and dwell times that are scalable to be used in the diffusiophoretic water filter of the present invention.

The present invention thus can also provide a test center with a plurality of test diffusiophoretic water filters with different operating characteristics. These characteristics can be varied to determine an appropriate channel size and flow velocity. The particle type, size and concentration also can be varied to increase the zeta potential of the combination, and the test devices used with those varied particle types, sizes and concentrations.

DETAILED DESCRIPTION

Figure 1:
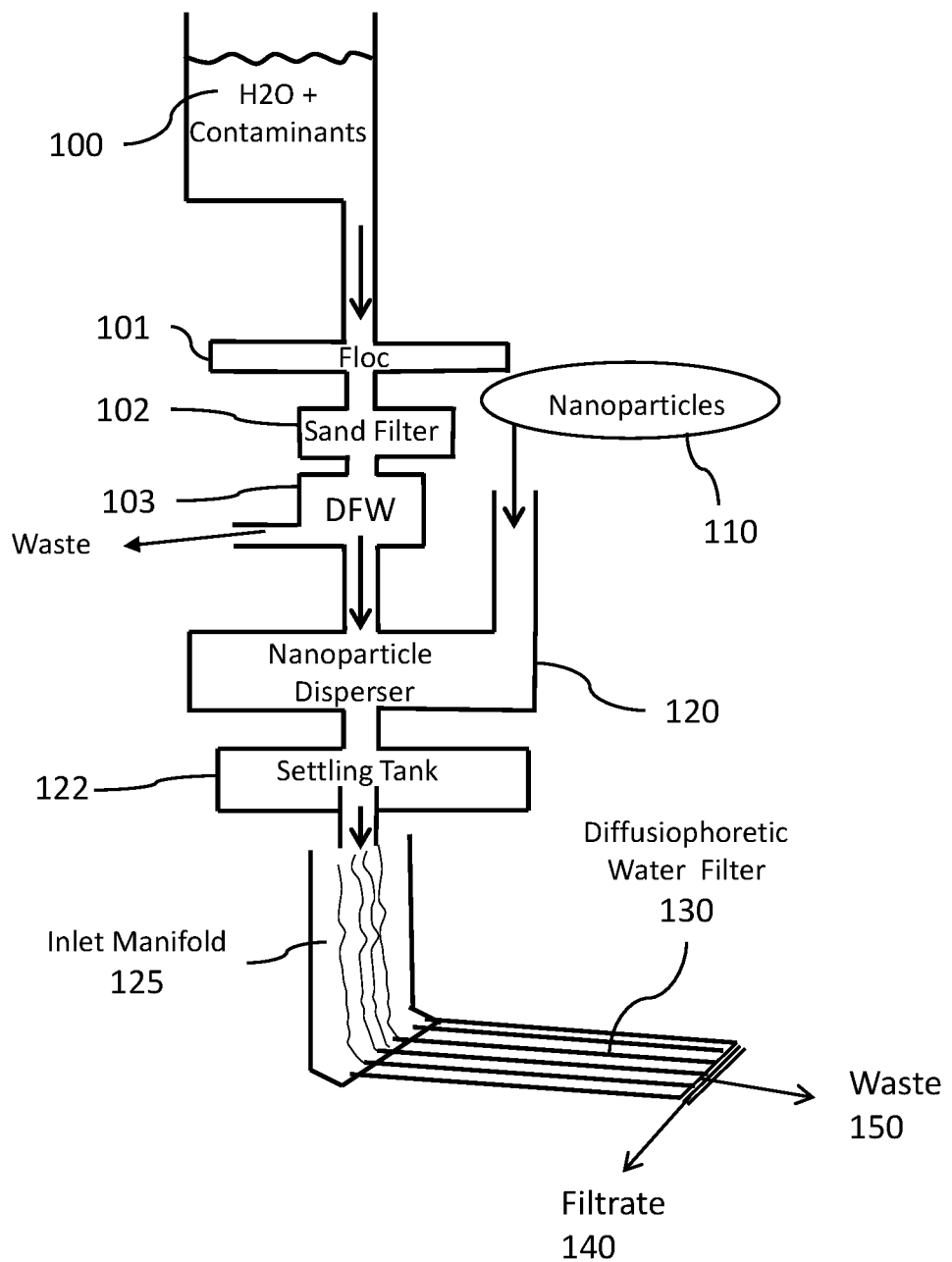
FIG. 1 shows a schematic of a device according to the present invention.

FIG. 1 shows a water source 100 with water and contaminants, for example perfluorooctanic acid (PFOA) or perfluorooctanesulfonic acid (PFOS). A nanoparticle source 110 can provide, for example, synthetic hematite ($FE_2O_3$) of a particle size of 1 to 20 nanometers in diameter. Smaller particle sizes however may be preferred, even of less than one nanometer, these still be defined herein as nanoparticles, as are all particles less than 100 nanometers in average diameter. The particle can be any type of particle but preferably is a metal oxide nanoparticle that is nontoxic, such as hematite, although if removal via the diffusiophoretic water filter is sufficient, even toxic nanoparticles could be used. Preferably, the average diameter of the nanoparticles is less than 20 nanometers., and more preferably less than 10 nanometers.

The water first may pass through typical pretreatments. A first treatment device 101 typically is a coagulation and flocculation sedimentation device, in which positively charged chemicals such as aluminum or iron salts are added to water from a contaminated source, such as a lake or river or ground water. These contaminants, typically dirt and other dissolved particles, are usually negatively charged. The bound particles bound to the chemicals are generally called floc. The floc settles to the bottom of a reservoir in a process called sedimentation.

The clarified water is then taken and passed through a pre-filter 102, often a mixture of materials such as sand, anthracite, garnet and granular activated carbon, to remove some particles and chemicals. However these sand filters often leave remaining bacteria, parasites and viruses, as well as chemicals and other particles such as nanoplastics.

Typically, after the prefilter 102, a UV treatment and/or chlorine treatment is used to kill the remaining viruses or bacteria. However, in the present invention, preferably a first diffusiophoretic water filter (DFW) 103 is used to remove the remaining negatively charged particles. This may be a DFW as described in Patent Application No. WO 2018/048735A1 or U.S. Pat. No. 10,155,182 B1 for example and preferably removes solely particles having a negative zeta potential in the water, and preferably all of those particles having a negative zeta potential of greater than −15 mV, and more preferably more than that −10 mV. Particles having zeta potentials of less than a certain amount, e.g. −10 mV can be removed by an additional settling step, should for example they be found to be present and their removal is desired.

In a next step, particles are intentionally introduced downstream of first DFW 103. The added particles are provided via a particle disperser 120 which may be any type of commercial mixing device sufficient to disperse the particles and allow for attraction of the contaminant. This process can take on the order of hours for PFOA and hematite as described for example in the article "Adsorption of perfluorooctanoic acid and perfluorooctanesulfonic acid to iron oxide surfaces as studied by flow-through ATR-FTIR spectroscopy" in Environ. Chem. 2012, 9, 148-157, by Xiaodong Gao and Jon Chorover. Advantageous mixing devices can include acoustic mixing at 10 to 100 Hz and tumblers and other turbulence enhancers. The pH, temperature and any other characteristics to increase the adsorption and/or zeta potential of the resultant adsorbed contaminant-particle combination can be altered in the disperser.

A settling tank 122 is preferably located downstream of the disperser 120, and adsorbed contaminant-particle combinations that have low zeta potentials can be settled via device 122, with any higher zeta potential adsorbed contaminant-particle combinations remaining in the supernatant above the settled particles. The supernatant colloidal suspension with the contaminant/particle combination and any other contaminants or particles from the water source in suspension then can pass to an inlet manifold 125 and be spread for travel through a diffusiophoretic water filter 130.

The colloidal particles remaining in the supernatant generally will have a negative charge by virtue of the adsorption of the negatively-charged chemicals, such as PFOA and PFOS, to the positively charged added nanoparticles. The zeta potential of these adsorbed chemical/nanoparticle combinations is more than −10 mV, for example −20 mV or more, as lower zeta potential particles generally will settle in device 122.

A filtrate 140 of clean water and a waste stream 150 with the negatively charged chemical/nanoparticle combinations result, with the waste stream having a large portion, preferably more than 99% and more preferably more than 99.9% of the contaminant/particle combination.

Figure 2:
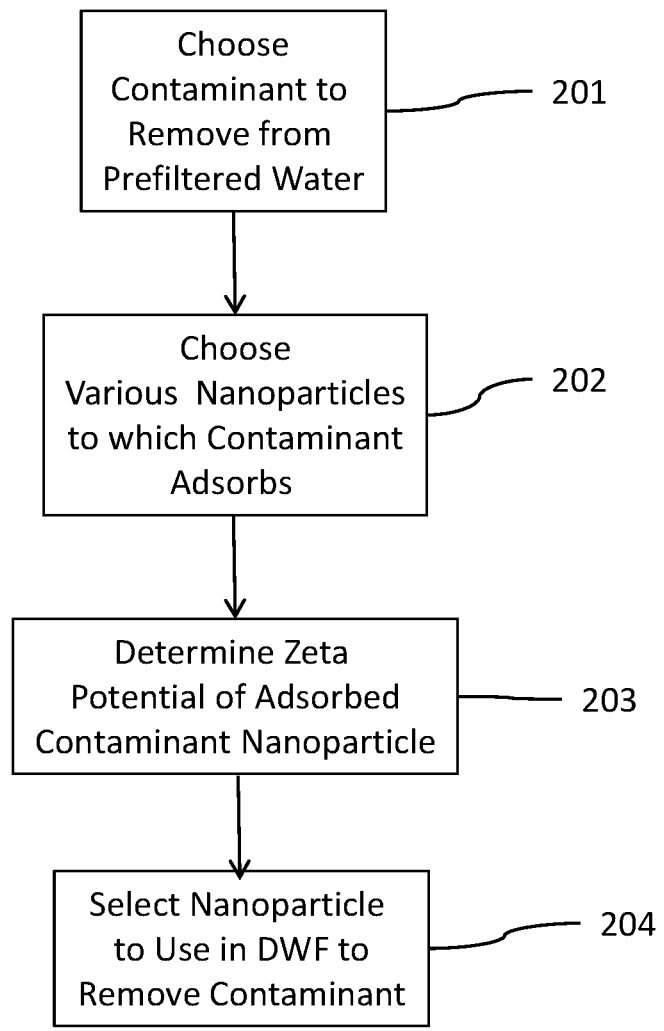
FIG. 2 shows a flow chart of a method of the present invention.

FIG. 2 shows a method for selecting a nanoparticle for use in a diffusiophoretic water filter to remove a particular contaminant. In step 201, a contaminant such as PFOA is selected for removal. Various nanoparticles are used to create nanoparticle/PFOA combinations in step 202. In step 203, the zeta potential of the adsorbed contaminant-particle combination in the water is measured with a commercial zeta potential analyzer, such as available from Brookhaven Instruments Corporation. In step 204, the zeta potential information is then used to determine the best nanoparticle to use, and if necessary to adjust appropriate characteristics for the diffusiophoretic water filter, such as flow rate, input pressure, CO2 pressure if gas is being used, channel width, length and thickness, and splitter location. The water used to test the zeta potential of the adsorbed contaminant-particle combination can be first pretreated with flocculation and settling, sand filtered, and diffusiophoretically pre-filtered for virus and bacteria removal, as described above, so that the contaminant testing is similar to that that would be faced in a real-world situation.

What is claimed is:

1. A diffusiophoretic water filtration system comprising: a diffusiophoretic water filter; and a particle disperser upstream of the diffusiophoretic water filter; wherein the diffusiophoretic water filtration system is configured to use nanoparticles having positive zeta potential in water to attract and adsorb contaminants to remove organic chemicals or other contaminants.

2. The diffusiophoretic water filtration system as recited in claim 1 further comprising a further water filter upstream of the particle disperser, the further water filter for removing negatively charged particles.

3. The diffusiophoretic water filtration system as recited in claim 1 wherein the particle disperser is a nanoparticle disperser.

4. The diffusiophoretic water filtration system as recited in claim 1 further comprising a settling tank located downstream of the particle disperser.

5. The diffusiophoretic water filtration system as recited in claim 1 further comprising a water input, the water input inputting water with a contaminant having a negative charge in the water, and the particle disperser disperses particles having a positive zeta potential in the water, and wherein the diffusiophoretic water filter removes a contaminant/particle combination having a zeta potential of greater than −10 mV.

6. The diffusiophoretic water filter as recited in claim 1 wherein the particle disperser includes nanoparticles selected from the group consisting of: Al2O3, Fe2O3, FeOOH, and SiO2.

7. The diffusiophoretic water filtration system as recited in claim 1 wherein the particle disperser is an acoustic mixer operating at 10 to 100 Hz.

8. The diffusiophoretic water filtration system as recited in claim 1 wherein the particle disperser includes a tumbler.

9. The diffusiophoretic water filtration system as recited in claim 1 wherein the diffusiophoretic water filter has channel characteristics determined as a function of zeta potential information of an adsorbed contaminant-particle combination.

10. The diffusiophoretic water filtration system as recited in claim 1 wherein the diffusiophoretic water filter has a flow rate determined as a function of zeta potential information of an adsorbed contaminant-particle combination.

11. A method for operating the diffusiophoretic water filtration system as recited in claim 1 comprising: adding a particle to water using the particle disperser to attract at least one contaminant and form an adsorbed contaminant-particle combination; and imparting diffusiophoretic action on the adsorbed contaminant-particle combination in the diffusiophoretic water filter to permit the adsorbed contaminant-particle combination to be filtered.

12. The method as recited in claim 11 further comprising prefiltering the water upstream of the particle disperser to remove negatively charged colloidal particles prior to adding the particle.

13. The method as recited in claim 11 wherein the contaminant is a PFOA or PFOS.

14. The method as recited in claim 13 wherein the particle is $Fe_2O_3$.

15. The method as recited in claim 14 wherein the $Fe_2O_3$ is provided with a particle size of 1 to 20 nanometers in diameter.

16. The method as recited in claim 11 wherein the water is subjected to coagulation and flocculation sedimentation before the adding.

17. The method as recited in claim 16 wherein after the coagulation and flocculation sedimentation and before the adding the water is subjected to a sand filtering.

18. A water filtration system comprising:
a sedimentation reservoir; and
the diffusiophoretic water filtration system as recited in claim 1 downstream of the sedimentation reservoir.

19. The water filtration system as recited in claim 18 further comprising a sand filter downstream of the sedimentation reservoir and upstream of the diffusiophoretic water filtration system.

20. The water filtration system as recited in claim 18 wherein no chlorination or UV treatment station is present.

* * * * *